United States Patent [19]

Saekusa et al.

[11] Patent Number: 5,046,820

[45] Date of Patent: Sep. 10, 1991

[54] OBJECTIVE LENS DRIVING APPARATUS

[75] Inventors: Shozo Saekusa, Ibaraki; Seiichi Katoh, Chigasaki; Akira Ikuma, Hiratsuka; Hiroshi Saito, Chigasaki; Isao Shimizu, Ibaraki, all of Japan

[73] Assignee: Hitachi, Ltd., Tokyo, Japan

[21] Appl. No.: 510,123

[22] Filed: Apr. 17, 1990

[30] Foreign Application Priority Data

Apr. 21, 1989 [JP] Japan ................................. 1-100150

[51] Int. Cl.$^5$ ............................................... G02B 7/02
[52] U.S. Cl. .................................. 359/814; 369/44.15; 359/824
[58] Field of Search ..................... 350/247, 252, 255; 369/44.14, 44.15

[56] References Cited

U.S. PATENT DOCUMENTS

| 4,566,089 | 1/1986 | Kime | 350/255 |
| 4,592,037 | 5/1986 | Ohnuki | 350/255 |
| 4,702,555 | 10/1987 | Iguma et al. | 350/247 |
| 4,752,117 | 6/1988 | Ichikawa et al. | 350/255 |
| 4,767,187 | 8/1988 | Gijzen et al. | 350/247 |
| 4,912,693 | 3/1990 | Goda | 369/44.14 |
| 4,948,230 | 8/1990 | Kasahara et al. | 350/255 |

FOREIGN PATENT DOCUMENTS 61-115249 6/1986 Japan .

Primary Examiner—Bruce Y. Arnold
Assistant Examiner—Loha Ben
Attorney, Agent, or Firm—Antonelli, Terry, Stout & Kraus

[57] ABSTRACT

An objective lens driving apparatus has a base provided with focusing permanent magnets and tracking permanent magnets, a supporting shaft mounted on the base, a lens holder for holding an objective lens at an extension thereof, with the lens holder being rotatably and slidably fitted onto the supporting shaft at a position of the center of gravity of the lens holder and being provided with focusing coils and tracking coils. A plurality of substantially identical elastic members are stretched between the base and the lens holder in a plane substantially perpendicular to the supporting shaft and in axisymmetrical relation with respect to Y-axis line joining the supporting shaft and the objective lens and X-axis line substantially perpendicular to the Y-axis. Each of the elastic members is a spring formed by a lead wire extending to the focusing and tracking coils. The springs are secured to the base through a viscous elastic material.

15 Claims, 10 Drawing Sheets

OBJECTIVE LENS DRIVING APPARATUS

BACKGROUND OF THE INVENTION

The present invention relates to an objective lens driving apparatus for an optical pick-up suitable for use in an optical disk apparatus such as a CD player, a CD-ROM or the like.

An objective lens driving apparatus for an optical pick-up has a lens holder and a base, and the objective lens is retained by the lens holder. The lens holder is mounted on the base so that it can be moved in the vertical direction (or focusing direction) with respect to an optical disk for focusing purposes, and in the radial direction (or tracking direction) of the optical disk for tracking purposes. Typical known arrangements for mounting lens holders on bases include a supporting arrangement utilizing wire means, such as disclosed in Japanese Patent Unexamined Publication No. 61-115249, and a supporting arrangement utilizing a supporting shaft, such as disclosed in U.S. Pat. No. 4,752,117.

In the former known arrangement, an objective lens is positioned at a center of a lens holder, and the lens holder is fixed to intermediate portions of a plurality of wires of which first ends are fixed to the base and opposite ends are inserted in respective bores formed in the base. In other words, the supporting arrangement utilizing wire means is characterized by the structure in which the lens holder is retained in a suspended state. The lens holder is provided with focusing coils and tracking coils, and the base is provided with a plurality of permanent magnets for forming a magnetic field.

When the focusing coils or the tracking coils are energized, the lens holder is made to move in the focusing direction or the tracking direction by elastically deforming the wires by an electromagnetic action produced between the energized coils and the permanent magnets provided on the base, thereby making adjustment of focus or tracking. When the focusing coil or the tracking coil is de-energized, the wires are recovered from elastic deformation and the lens holder is restored to its original position.

The above arrangement has a number of disadvantages. For example, since the lens holder is, as described above, retained in a suspended state by the wires, it is subject to rolling or pitching due to dynamic external forces acting on the objective lens driving apparatus. Further, the flexure and twist characteristics of the wires are difficult to equalize due to subtle differences between the fixed state of the wires. These disadvantages have adverse influences on a servo control system for the lens holder and, for example, the objective lens may deviate from the predetermined direction to impair the accuracy of position control.

In the latter arrangement, an objective lens is mounted on the extension of a lens holder, and the lens holder is rotatably and slidably fitted onto a supporting shaft mounted on a base at a position of the center of balance of the lens holder. A plurality of rubber members for restoration to an original position are connected between the lens holder and the base. The points of the respective rubber members connected to the lens holder are displaced from one another in the direction of the height of the supporting shaft because of the space in the objective lens driving apparatus. In addition, the lens holder is provided with the focusing coils and the tracking coils, and lead wires connected to the respective coils are suspended from the lens holder.

When the focusing coils are energized, the lens holder slides along the supporting shaft by an electromagnetic action produced between the focusing coils and focusing magnets provided on the base, thereby enabling adjustment of the focus of the objective lens. When the tracking coils are energized, the lens holder rotates about the supporting shaft by an electromagnetic action produced between the tracking coils and tracking magnets provided on the base, thereby enabling adjustment of tracking.

In the above-described arrangement, since the lens holder is fitted onto the supporting shaft, it is possible to suppress severe rolling and pitching due to dynamic external forces which may be experienced with the supporting arrangement utilizing wire means. However, since the points of the respective rubber members connected to the lens holder differ from one another in the direction of the height of the supporting shaft, a moment acts to incline the lens holder. As a result, the lens holder may be inclined and an edge of the fitting portions of the lens holder is engaged with the supporting shaft, thereby impairing the smooth rotary or sliding motion of the lens holder. In addition, since the material of the elastic members for restoration to an original position is a rubber, the variation of the characteristics thereof is large, thereby making it difficult to realize accurate position control. Furthermore, since the lens holder instantaneously rotates or slides, the inertia of lead wires suspended from the lens holder has an adverse influence on the control of the lens holder and this may make it more difficult to realize accurate position control. Also, since the lens holder repeatedly rotates or slides, repetitive bending stresses act on the lead wires suspended from the lens holder. As a result, the lead wires may be broken by being fatigued with the repetitive bending stresses.

SUMMARY OF THE INVENTION

It is therefore an object of the present invention to provide an objective lens driving apparatus capable of providing high-precision position control of a lens holder and free from the risk of lead wires of focusing and tracking coils being broken.

To achieve the above object, according to the present invention, there is provided an objective lens driving apparatus which, in one preferred form, includes a base provided with focusing permanent magnets and tracking permanent magnets, a supporting shaft mounted on the base, a lens holder for holding an objective lens at an extension thereof, with the lens holder being rotatably and slidably fitted onto the supporting shaft at the position of the center of balance of the lens holder and being provided with focusing coils and tracking coils, and a plurality of approximately identical elastic members stretched between the base and the lens holder in a plane substantially perpendicular to the supporting shaft and in axi-symmetrical relation with respect to a Y-axis line joining the supporting shaft and the objective lens and an X-axis line substantially perpendicular to the Y-axis.

Preferably, each of the elastic members is a spring formed by a lead wire extending to the focusing coils and the tracking coils.

Preferably, each of the elastic members is secured to the base through a viscous elastic material. The focusing coils and the tracking coils are preferably arranged symmetrically with respect to the Y axis and the X axis.

According to the present invention, there is provided an objective lens driving apparatus which, in another preferred form, includes a base provided with focusing permanent magnets and tracking permanent magnets, a supporting shaft mounted on the base, a lens holder for holding an objective lens at an extension thereof, the lens holder being rotatably and slidably fitted onto the supporting shaft at the position of the center of balance of the lens holder and being provided with focusing coils and tracking coils, and a plurality of approximately identical elastic members stretched between the base and the lens holder in a plane substantially perpendicular to the supporting shaft, with the elastic members being equiangularly radially arranged about the supporting shaft.

In the above preferred form, each of the elastic members is preferably a spring formed by a lead wire extending to the focusing coils and the tracking coils, and is secured to the base through a viscous elastic material. The focusing coils and the tracking coils are preferably arranged symmetrically with respect to the Y axis and the X axis.

According to the present invention with a view from a somewhat different perspective, there is also provided an objective lens driving apparatus which includes a base provided with focusing permanent magnets and tracking permanent magnets, a supporting shaft mounted on said base, a lens holder for holding an objective lens at an extension thereof, with the lens holder being rotatably and slidably fitted onto the supporting shaft at the position of the center of balance of the lens holder and being provided with focusing coils and tracking coils, and with lead wires extending to the focusing coils and lead wires extending to the tracking coils. The lead wires are stretched between the base and the lens holder in a plane substantially perpendicular to the supporting shaft in axi-symmetrical relation with respect to a Y axis joining the supporting shaft and the objective lens and an X axis substantially perpendicular to the Y axis.

The lead wires are preferably formed into four springs having substantially the same spring characteristics. The four lead wires are preferably secured to the base through viscous elastic material.

DESCRIPTION OF THE PREFERRED EMBODIMENTS

Figure 1:
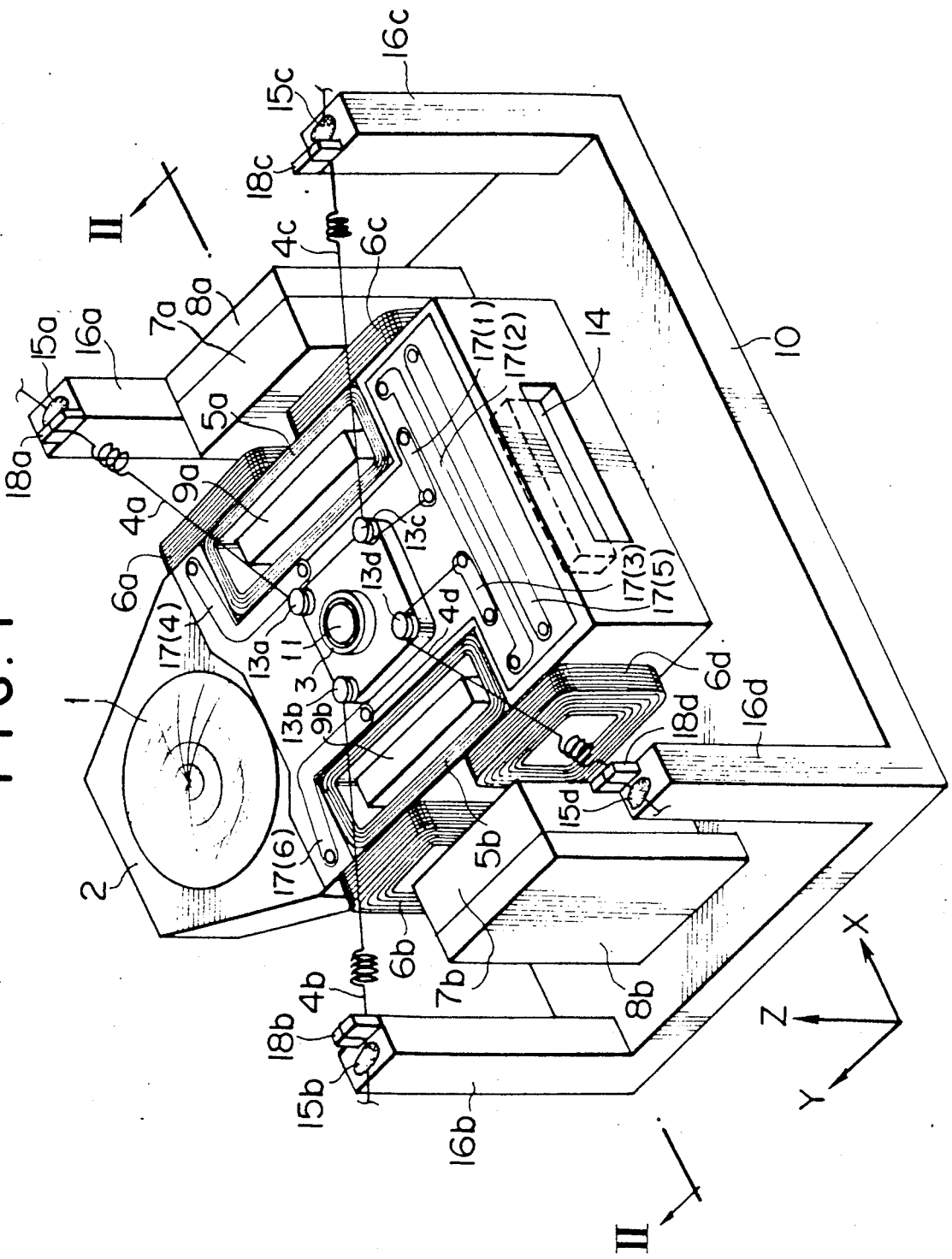
FIG. 1 is a perspective view showing an embodiment of an objective lens driving apparatus according to the present invention.
Figure 2:
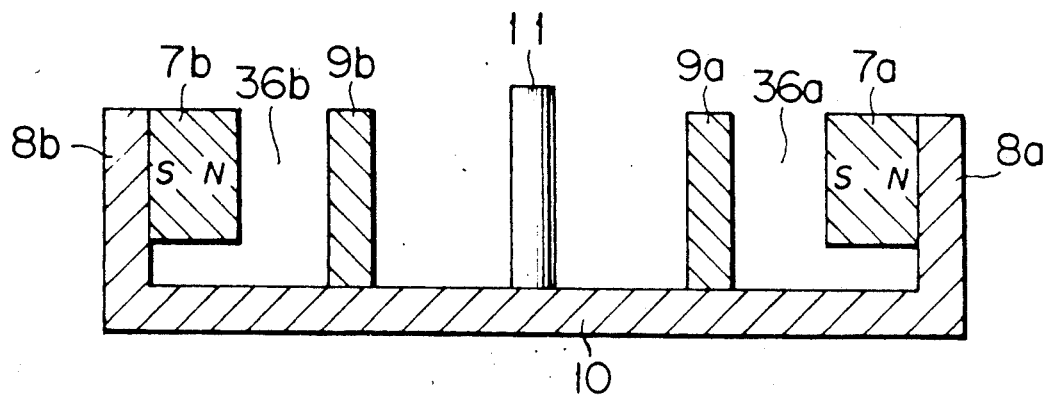
FIG. 2 is a cross-sectional view taken along line II—II of FIG. 1.

Referring now to FIGS. 1-7, according to the present invention, an objective lens driving apparatus is provided with a base 10 and a lens holder 2, and a supporting shaft 11, covered with a resin coating of low friction coefficient, is mounted at a substantially center portion of the base 10.

An objective lens 1 is fixedly inserted into an extension of the lens holder 2. A bearing bore 3 is formed at the center of the gravity of the lens holder 2 inclusive a balance weight 14, focusing coils 5a, 5b and tracking coils 6a, 6b, 6c, 6d, all of which will be explained later. The lens holder 2 is rotatably and slidably fitted onto the supporting shaft 11. A line which joins the center of the objective lens 1 and the center of the bearing bore 3 is referred to as the "Y axis", the axis of the bearing bore 3 is referred to as the "Z axis", and a line intersecting the Y and Z axes is referred to as the "X axis". The focusing coils 5a and 5b are arranged symmetrically with respect to the X and Y axes in opposite recesses which are formed in the lens holder 2 along the Y axis. The four tracking coils 6a, 6b, 6c and 6d are arranged symmetrically with respect to the Y and X axes outwardly of the focusing coils 5a and 5b. The balance weight 14 is fixed to a side of the lens holder 2 which is opposite to the side on which the objective lens 1 is held in position. Pins 13a, 13b, 13c and 13d are mounted on the top of the lens holder 2 symmetrically with respect to the X and Y axes.

The base 10 is provided with inner yokes 9a, 9b and outer yokes 8a, 8b, which are mounted symmetrically with respect to the Y axis, as well as four posts 16a, 16b, 16c and 16d, which are mounted symmetrically with respect to the Y and X axes. Permanent magnets 7a and 7b are fixed to the respective outer yokes 8a and 8b in such a manner that the polarity of each of the permanent magnets 7a and 7b is oriented in the same direction. A magnetic gap 36a is defined between the inner yoke 9a and the permanent magnet 7a, while a magnetic gap 36b is defined between the inner yoke 9b and the permanent magnet 7b. The focusing coil 5a and the tracking coils 6a and 6c are inserted in the magnetic gap 36a, while the focusing coil 5b and the tracking coils 6b and 6d are inserted in the magnetic gap 36b. Slit pieces 18a, 18b, 18c and 18d are disposed on the top of the posts 16a, 16b, 16c and 16d, respectively.

Figure 3:
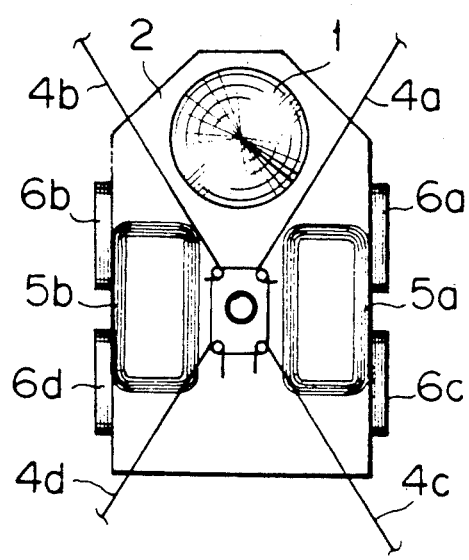
FIG. 3 is a diagrammatic top plan view showing the lens holder of the embodiment shown in FIG. 1.
Figure 4:
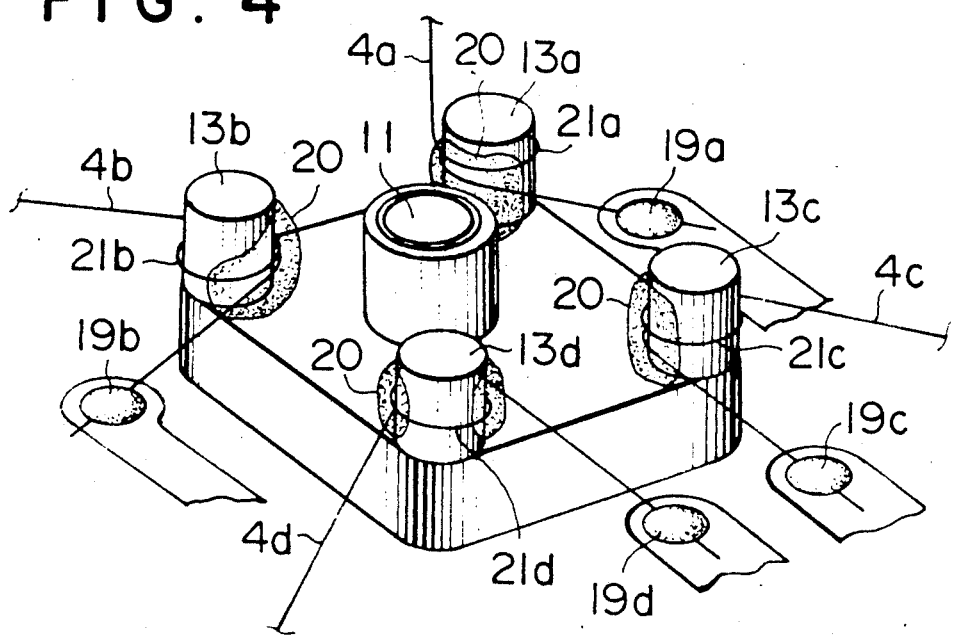
FIG. 4 is a partial perspective view showing the lens holder of the embodiment shown in FIG. 1.

Elastic members 4a, 4b, 4c and 4d extend through slits formed in the corresponding slit pieces 18a, 18b, 18c and 18d, and are fixed by solder joints 15a, 15b, 15c and 15d. The other ends of the elastic members 4a, 4b, 4c and 4d are engaged with the respective pins 13a, 13b, 13c and 13d and are fixed by an epoxy- or silicon-type adhesive 20 as shown in FIG. 4. As shown in FIG. 3, the elastic members 4a, 4b, 4c and 4d are radially arranged to join the lens holder 2 and the base 10, thereby elastically retaining the lens holder 2 in a plane substantially perpendicular to the supporting shaft 11. In the illustrated embodiment, the elastic members 4a, 4b, 4c and 4d are made of a wire of electrically conductive material, and have the configuration of a coil spring, as shown in FIG. 1, as well as substantially identical spring characteristics. The extending ends of the respective elastic members 4a, 4b, 4c and 4d are connected to electrical leads, not shown, while the other ends are fixed by corresponding solder joints 19a, 19b, 19c and 19d to wiring patterns 17(1), 17(2), 17(3), 17(4), 17(5) and 17(6) formed on the top surface of the lens holder 2. Direct current for the focusing coils 5a and 5b is made to flow in a series circuit which is formed in order by the elastic member 4c, the wiring pattern 17(1), the focusing coil 5a, the wiring pattern 17(2), the focusing coil 5b, the wiring pattern 17(2), the focusing coil 5b, the wiring pattern 17(3) and the elastic member 4d. Direct current for the tracking coils 6a, 6b, 6c and 6d is made to flow in a series circuit which is formed in order by the elastic member 4a, the wiring pattern 17(4), the tracking coils 6a, 6c, the wiring pattern 17(5), the tracking coils 6d, 6b, the wiring pattern 17(6) and the elastic circuit 4b.

Figure 5:
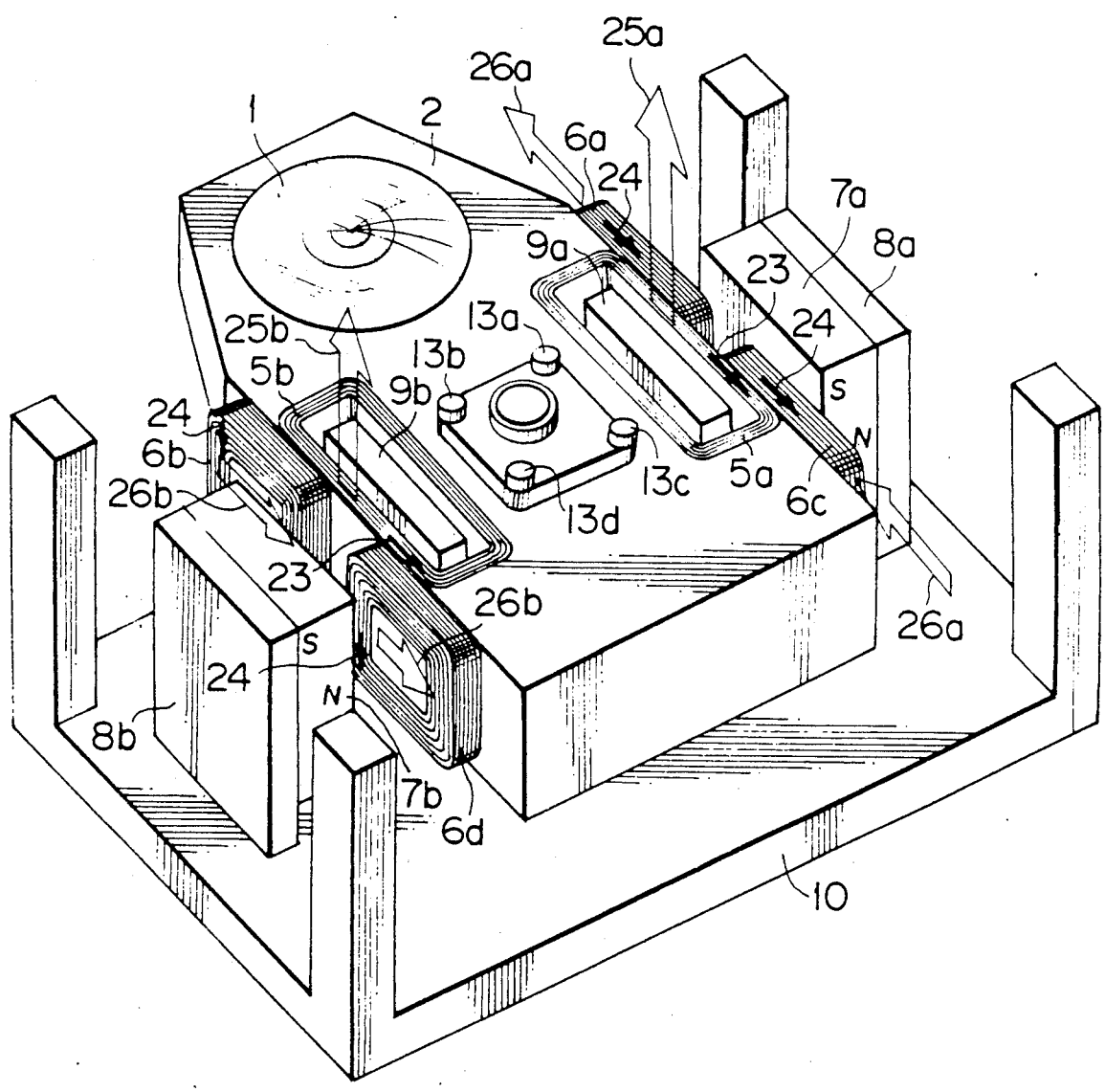
FIG. 5 is a diagrammatic perspective view which serves to illustrate the motion of the lens holder of the embodiment shown in FIG. 1.

FIG. 5 shows a relationship between driving forces acting on the lens holder 2 and the direct current supplied to the focusing coils 5a, 5b and the tracking coils 6a-6d. If a direct current is made to flow in the focusing coils 5a and 5b in a direction indicated by the arrows 23, driving forces act on the respective coils 5a and 5b in a direction indicated by the arrows 25a and 25b, thereby moving the lens holder 2 upward as viewed in FIG. 5. If a direct current is made to flow in the tracking coils 6a, 6b, 6c and 6d in a direction indicated by the arrows 24, driving forces act on the tracking coils 6a and 6c in a direction indicated by the arrows 26a, while the driving forces act on the tracking coils 6b and 6d in a direction indicated by the arrows 26b. These driving forces form the moment of a couple of forces about the supporting shaft 11, and the lens holder 2 is rotated about the supporting shaft 11 and the objective lens 1 is moved in the tracking direction.

Figure 6:
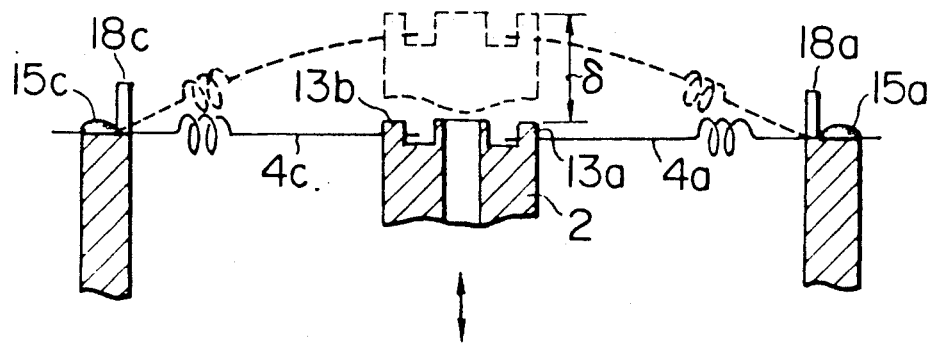
FIGS. 6 and 7 are schematic views showing the state of deformation of the elastic members used in the embodiment shown in FIG. 1.

FIG. 6 shows the state of the lens holder 2 moved up by the above described driving forces. When the lens holder 2 is moved to the upper position shown by dashed lines, the elastic members 4a-4d are deformed symmetrically with respect to the center line of the lens holder 2, that is to say, the respective elastic members 4a-4d apply equal forces to the lens holder 2. Accordingly, no moment occurs which may incline the lens holder 2 to bring the edge of the bearing bore 3 of the lens holder 2 into contact with the supporting shaft 11 and hinder the sliding motion of the lens holder 2 and, consequently, stable focusing can be achieved.

Figure 7:
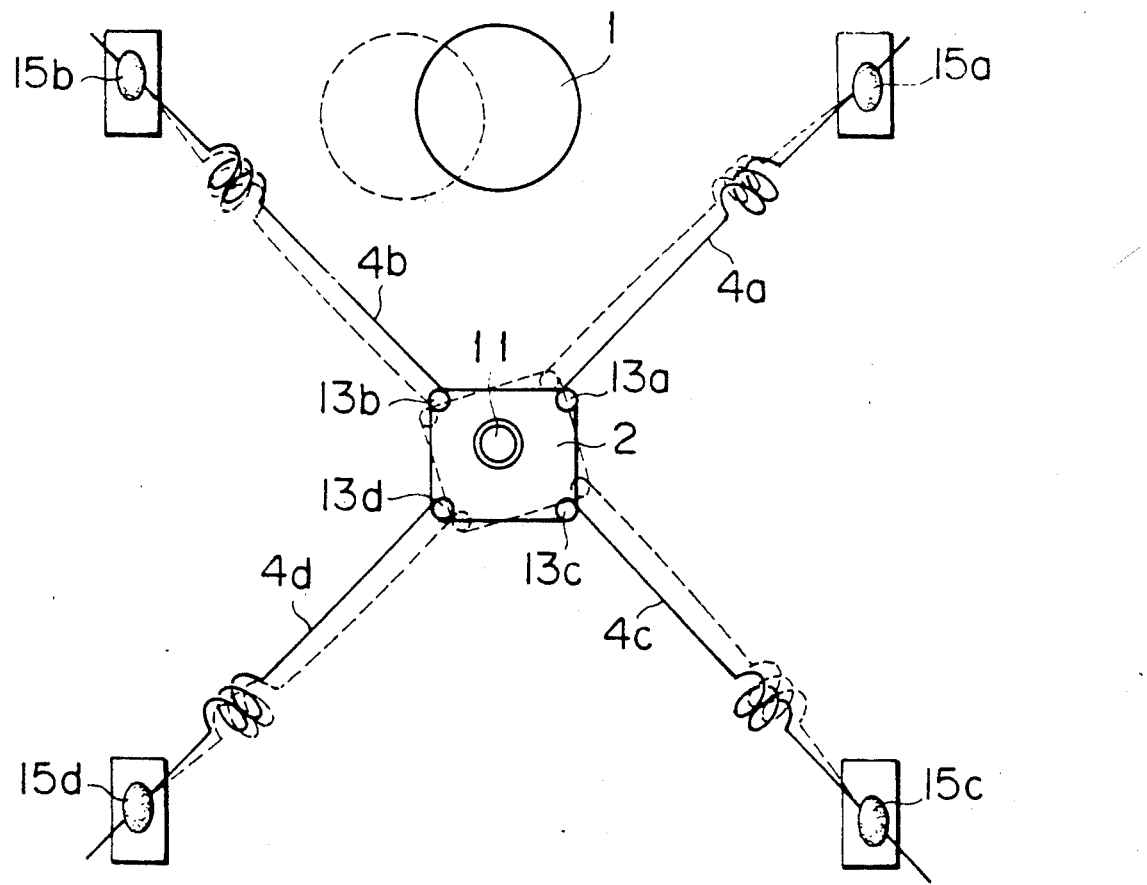
Figure 8:
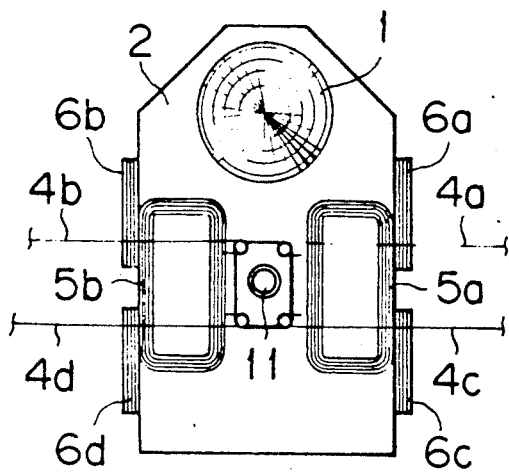
FIGS. 8 through 13 are schematic top plan views showing modifications in each of which the elastic members are altered in number or position.

FIG. 7 is a schematic top plan view showing the state of the lens holder 2 being rotated about the supporting shaft 11. When the lens holder 2 is rotated as shown by dashed lines, the elastic members 4a-4d are deformed symmetrically about the center line of the supporting shaft 11. The elastic members 4a-4d apply equal forces to the lens holder 2 and the points of application exist in one plane substantially perpendicular to the supporting shaft 11. Accordingly, no moment occurs which may incline the lens holder 2 to bring the edge of the bearing bore 3 of the lens holder 2 into contact with the supporting shaft 11 and hinder the rotary motion of the lens holder 2. Consequently, stable tracking can be achieved.

As is apparent from the foregoing, by arranging the elastic members 4a-4d for restoration of the original position in one plane substantially perpendicular to the supporting shaft 11, the lens holder 2 can be made to rotate and slide smoothly, that is to say, the tracking and focusing of the objective lens 1 can be achieved with improved accuracy. By making the elastic members 4a-4d of metal, it is possible to reduce the variation of their spring characteristics of facilitate the position control. In addition, the spring characteristics can be readily altered and therefore, the resonance frequency of the lens holder 2 can be readily altered. It is also possible to design a lens holder having a resonance frequency of, for example, 35 Hz or less. Furthermore, since the above-described embodiment utilizes the elastic members 4a-4d as lead wires for supply of electric current to the focusing and tracking coils, it is possible to solve the problems which may be encountered with the prior art arrangements, that is, the adverse influence of the inertia of suspended lead wires on position control and the breakage of the lead wires.

Figure 9:
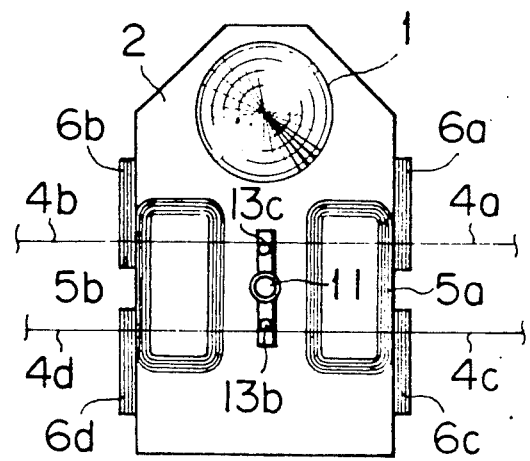
Figure 10:
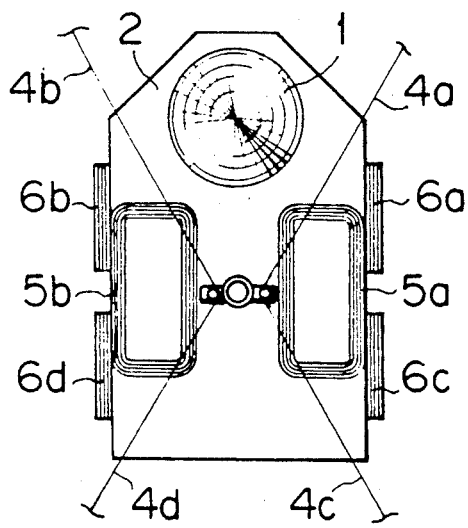
Figure 11:
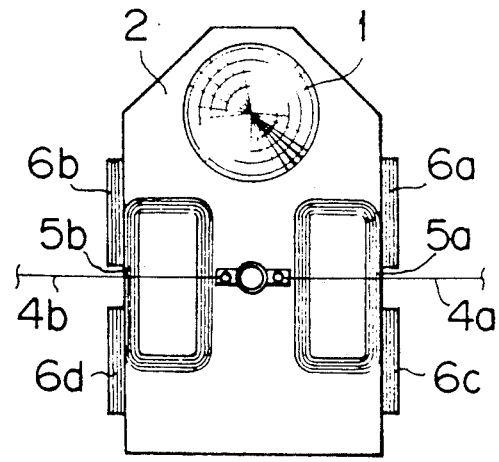
Figure 12:
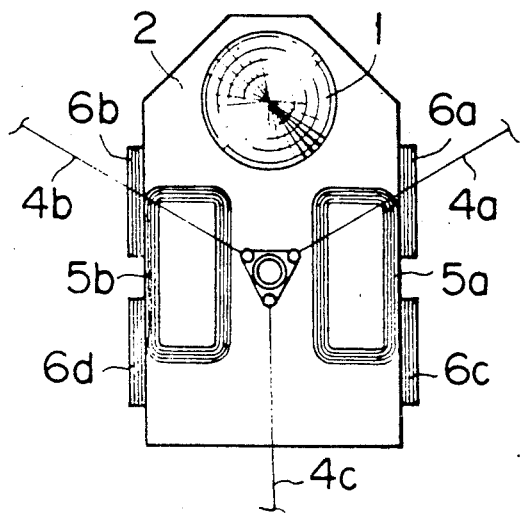
Figure 13:
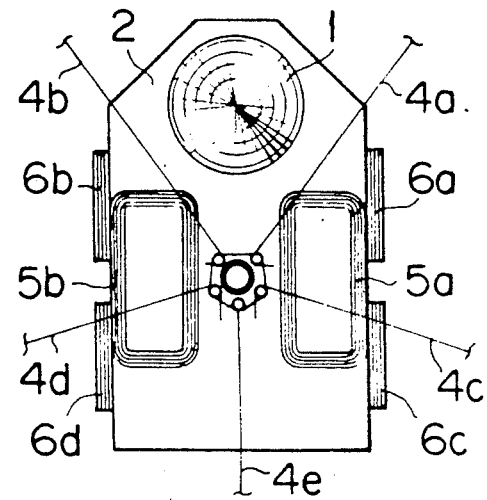
Figure 14:
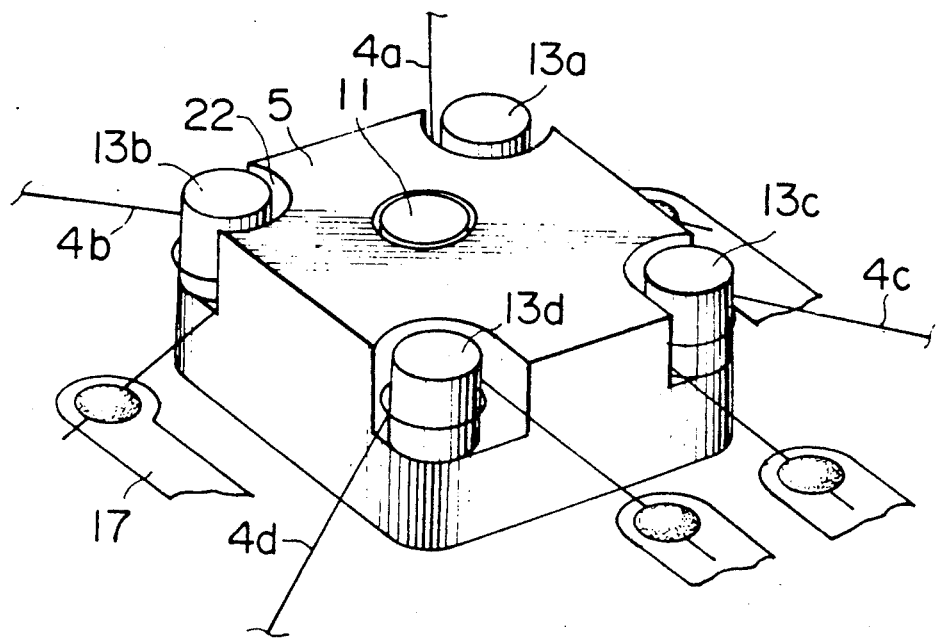
FIGS. 14 through 19 are schematic views showing modifications in each of which the elastic members are secured to the top of the lens holder in a different form.
Figure 15:
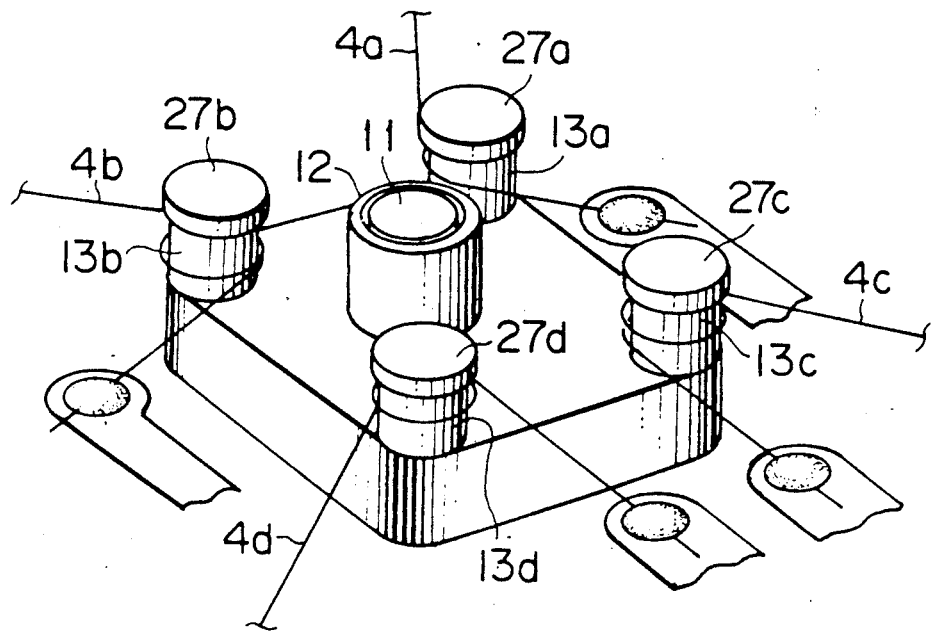
Figure 16:
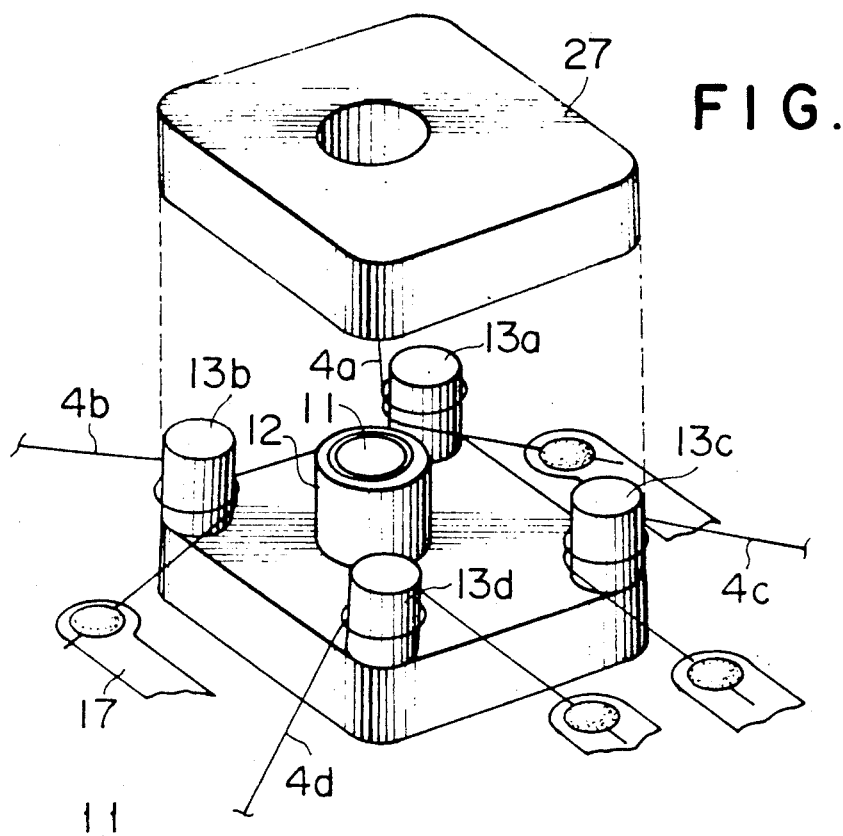
Figure 17:
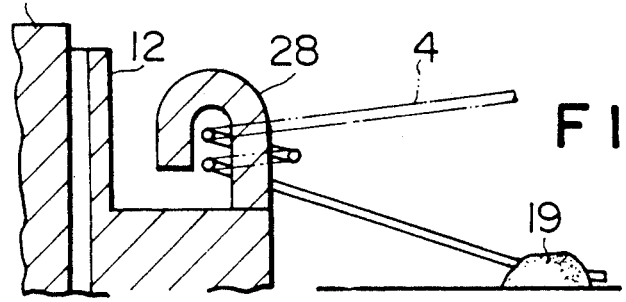
Figure 18:
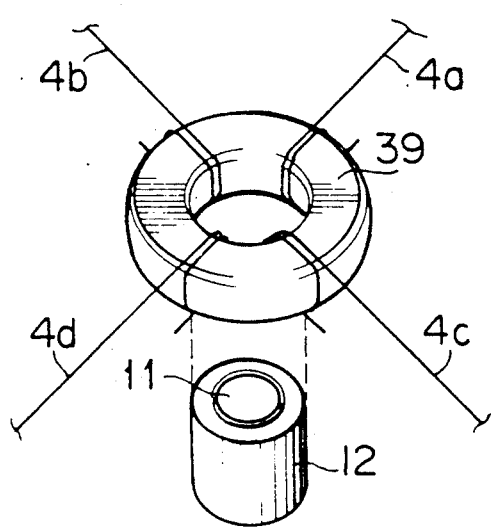
Figure 19:
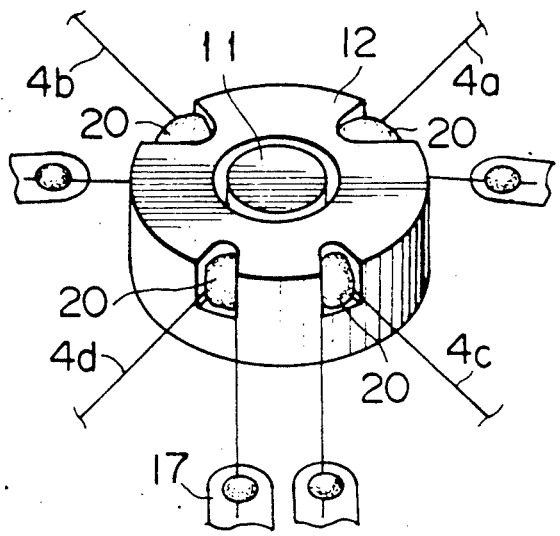

FIGS. 8-13 show modifications of the above embodiment in each of which elastic members are altered in number or position. In the modification shown in FIG. 8, the four elastic members 4a, 4b, 4c and 4d are arranged symmetrically with respect to the Y axis and in parallel with the X axis. The modification shown in FIG. 9 is similar to that of FIG. 8 in that the four elastic members 4a, 4b, 4c and 4d are arranged symmetrically with respect to the Y axis and in parallel with the X axis, but, in the modification of FIG. 9, the elastic members are secured in position by a total of two pins. In the modification shown in FIG. 10, the four elastic members 4a, 4b, 4c and 4d are arranged to extend radially from two pins. In the modification shown in FIG. 11, two elastic members 4a and 4b are arranged to extend along the X axis. In the modification shown in FIG. 12, three elastic members 4a, 4b and 4c are equiangularly radially arranged about the supporting shaft 11 and, in the modification shown in FIG. 13, five elastic members 4a, 4b, 4c, 4d and 4e are equiangularly radially arranged about the supporting shaft 11. In each of the modifications described above, although the elastic members are secured in position on the top of the lens holder 2, they may be secured on the bottom of the lens holder 2.

FIGS. 14-19 show modifications of the member in which elastic members are secured in position on the top of a lens holder. In the modification shown in FIG. 14, guide grooves 22 are formed in the lens holder 2 along the peripheries of the respective pins 13a-13d. The guide grooves 22 serve as means for assisting in engaging the elastic members 4a-4d with the pins 13a-13d, respectively, thereby facilitating the operation of engaging these elastic members. In the modification shown in FIG. 15, the pins 13a, 13b, 13c and 13d of FIG. 4 are provided with flanges 27a, 27b, 27c and 27d, respectively. This modification contemplates improving the reliability of the engagement of the elastic members. The flanges 27a-27d may be prepared as parts separate from the pins and mounted thereon after the elastic members have been brought into engagement with the pins in the modification shown in FIG. 16, a cap 27 is added to the arrangement of the embodiment of FIG. 4. After the elastic members 4a-4d have been brought into engagement with the respective pins 13a-13d, the cap 27 is fitted onto the pins 13a-13d to improve the positioning accuracy of the elastic members 4a-4d and to prevent the elastic members 4a-4d from coming off. In the modification shown in FIG. 17, a hook 28 is formed in place of each pin so as to prevent the elastic members from coming off. In the modification shown in FIG. 18, the elastic members 4a-4d are secured to a ring 39 which is, in turn, fitted onto a cylindrical portion formed on the lens holder 2. In the modification shown in FIG. 19, the pins 13a-13d are omitted and the elastic members 4a-4d are secured directly to the lens holder 2 by the adhesive 20.

Figure 20:
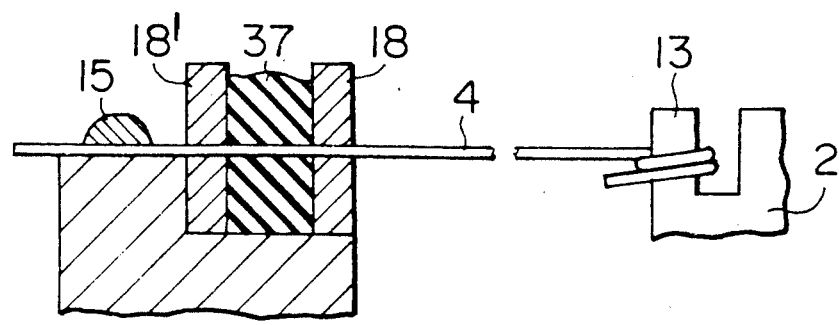
FIGS. 20 and 21 are schematic cross-sectional view showing modifications in each of which the elastic members are secured to the respective posts of the base in a different form.
Figure 21:
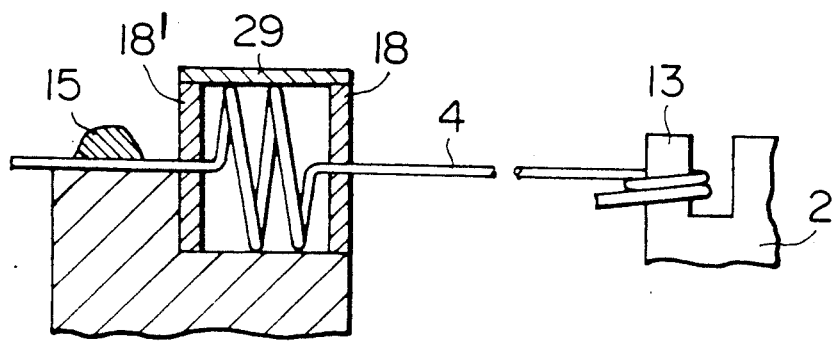

FIGS. 20 and 21 show modifications of the member in each of which an elastic member 4 is secured to posts 16 of the base 10. In the modification of FIG. 20, two slit 18 and 18' are spaced apart from each other, and a viscous elastic material 37 such as silicone rubber is inserted therebetween to impart damping characteristics to the elastic member 4. In the modification of FIG. 21, the two slits 18 and 18' are spaced apart from each other to form a box like space, and a coiled part of the elastic member 4 is positioned in the space and a viscous elastic material such as silicone is filled in the space, thereby the elastic member 4 having a damping characteristic. With either of these modifications, it is possible to impart the desired damping characteristics to the lens holder 2, whereby vibration derived from external forces can be damped quickly.

Figure 22:
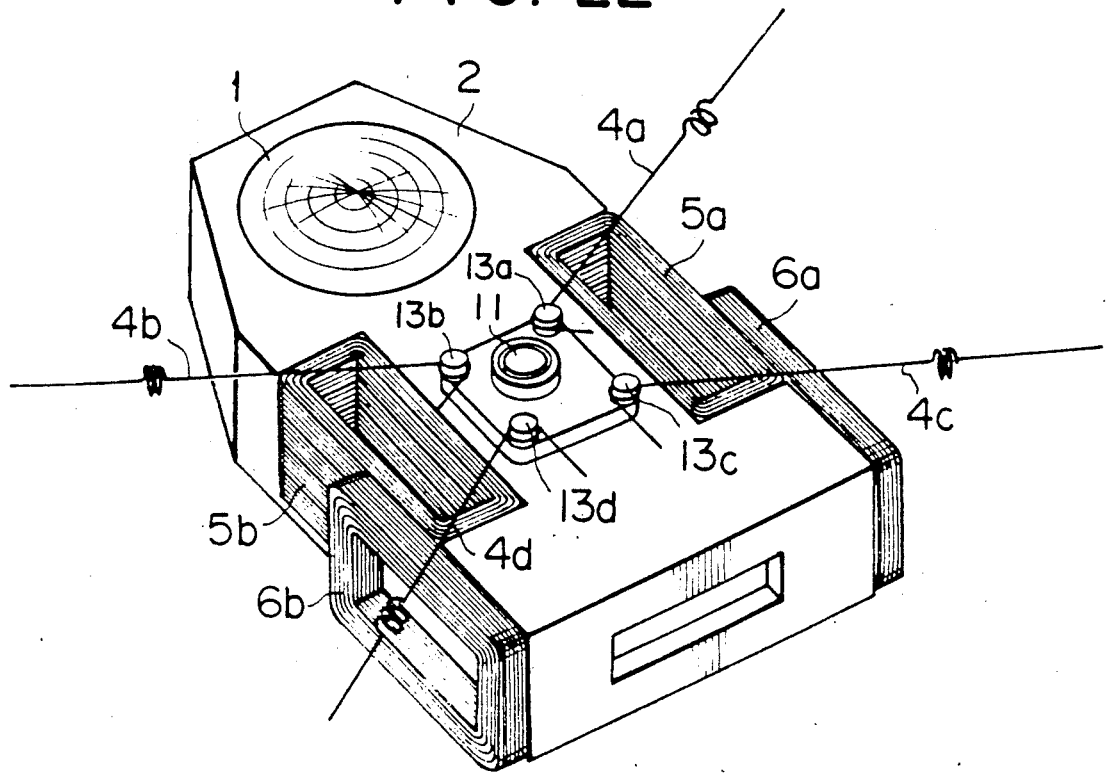
FIGS. 22 through 26 are schematic perspective views showing modifications in which focusing coils or tracking coils are altered in number or position.
Figure 23:
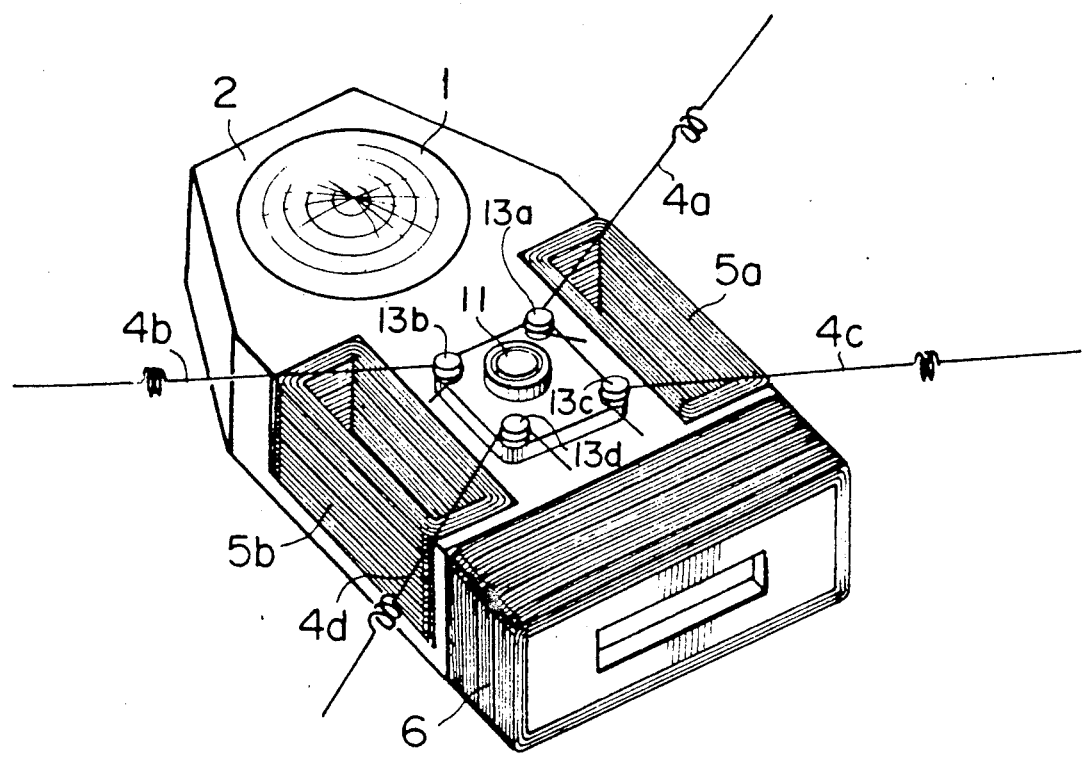
Figure 24:
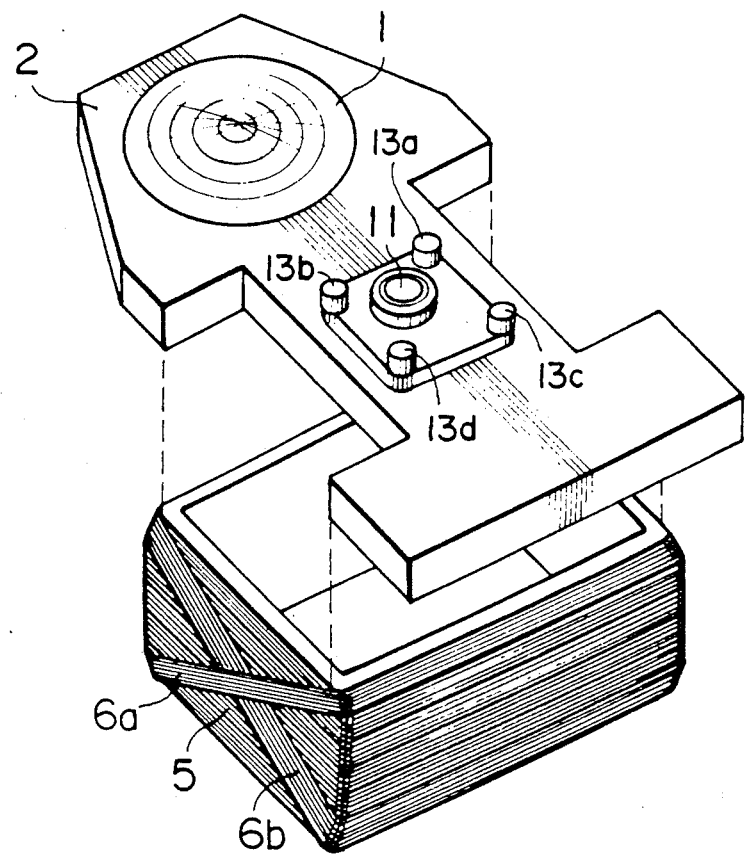
Figure 25:
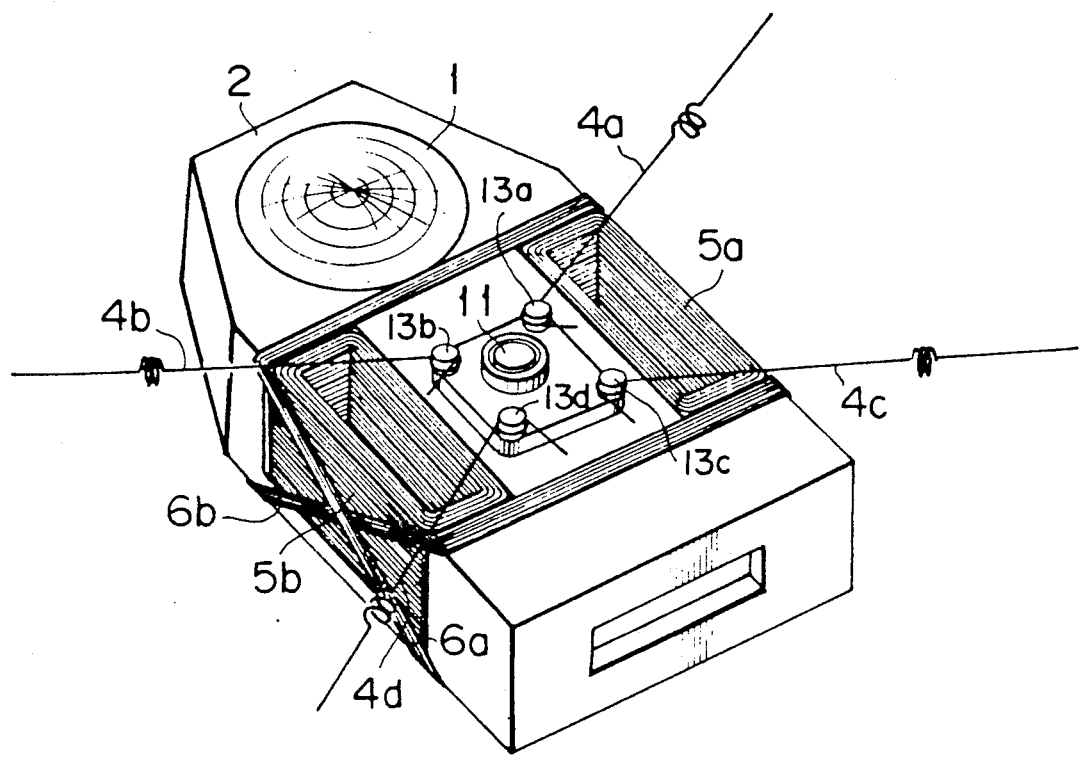
Figure 26:
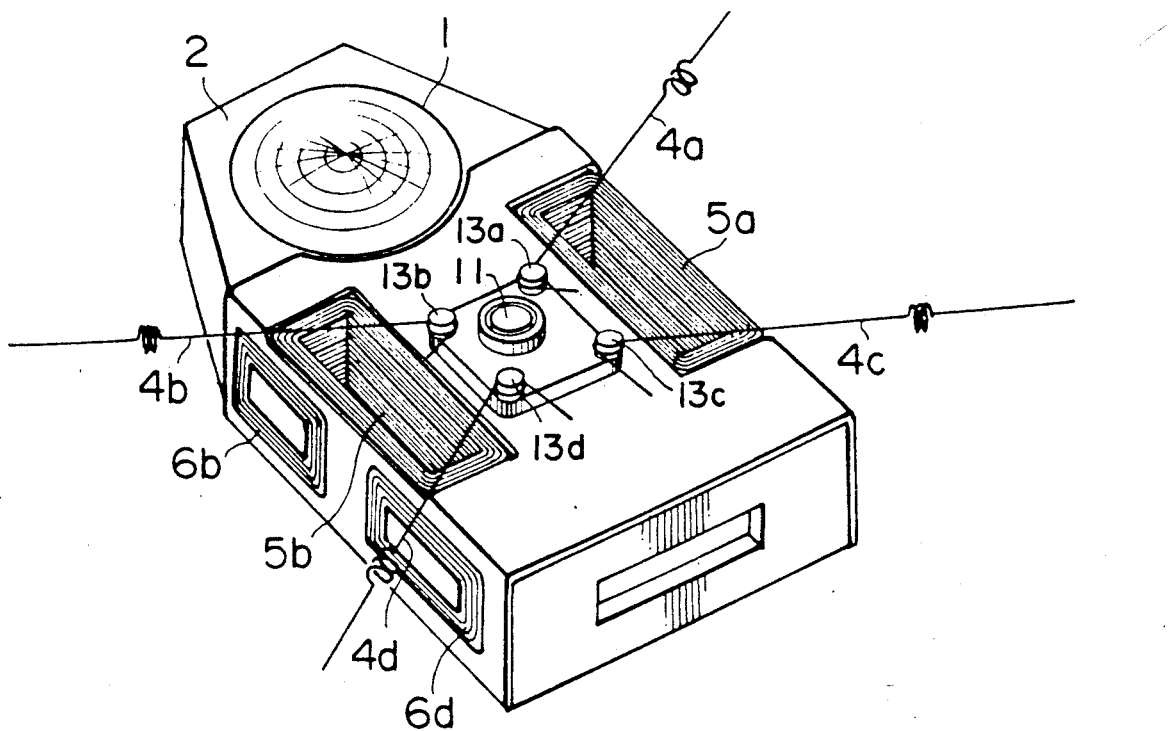

FIGS. 22 to 26 show modifications in each of which focusing and tracking coils are altered in number and position. The modification of FIG. 22 is provided with two focusing coils 5a and 5b and two tracking coils 6a and 6b, and the tracking coils 6a and 6b are arranged so that the center of gravity of the lens holder 2 coincides with the center of the bearing bore 3. The balance weight 14 can be omitted. The modification of FIG. 23 is provided with two focusing coils 5a and 5b and a single tracking coil 6 and, in place of the balance weight 14, the tracking coil 6 is arranged so that the center of gravity of the lens holder 2 coincides with the center of the bearing bore 3. The modification of FIG. 24 is provided with a single focusing coil 5 and the tracking coils 6a and 6b are crosswise wound around the focusing coil 5. In the modification of FIG. 25, two tracking coils 6a and 6b are crosswise wound around two focusing coils 5a and 5b. In the modification of FIG. 26, four tracking coils 6a, 6b, 6c and 6d are formed as printed coils. The focusing coils 5a and 5b may also be printed.

What is claimed is:

1. An objective lens driving apparatus comprising:
   a base provided with focusing permanent magnets and tracking permanent magnets;
   a supporting shaft mounted on said base;
   a lens holder for holding an objective lens at an extension thereof, said lens holder being rotatably and slidably fitted onto said supporting shaft at a position of the center of gravity of said lens holder and being provided with focusing coils and tracking coils; and
   a plurality of substantially identical elastic members stretched between said base and said lens holder in a plane substantially perpendicular to said supporting shaft and in axi-symmetrical relation with respect to Y-axis line joining said supporting shaft and said objective lens and X-axis line substantially perpendicular to said Y-axis.

2. An objective lens driving apparatus according to claim 1, wherein each of said elastic members includes a spring formed by a lead wire extending to said focusing coils and said tracking coils.

3. An objective lens driving apparatus according to claim 2, wherein each of said elastic members is secured to said base through a viscous elastic material.

4. An objective lens driving apparatus according to claim 1, wherein each of said elastic members is secured to said base through a viscous elastic material.

5. An objective lens driving apparatus according to claim 1, wherein said focusing coils and said tracking coils are arranged symmetrically with respect to said Y axis and said X axis.

6. An objective lens driving apparatus comprising:
   a base provided with focusing permanent magnets and tracking permanent magnets;
   a supporting shaft mounted on said base;
   a lens holder for holding an objective lens at an extension thereof, said lens holder being rotatably and slidably fitted onto said supporting shaft at a position of the center of gravity of said lens holder and being provided with focusing coils and tracking coils; and
   a plurality of substantially identical elastic members stretched between said base and said lens holder in a plane substantially perpendicular to said supporting shaft, said elastic members being equiangularly radially arranged about said shaft.

7. An objective lens driving apparatus according to claim 6, wherein each of said elastic members is a spring formed by a lead wire extending to said focusing coils and said tracking coils.

8. An objective lens driving apparatus according to claim 7, wherein each of said elastic members is secured to said base through a viscous elastic material.

9. An objective lens driving apparatus according to claim 6, wherein each of said elastic members is secured to said base through a viscous elastic material.

10. An objective lens driving apparatus according to claim 6, wherein said focusing coils and said tracking coils are arranged symmetrically with respect to said Y axis and said X axis.

11. An objective lens driving apparatus comprising:
    a base provided with focusing permanent magnets and tracking permanent magnets;
    a supporting shaft mounted on said base;
    a lens holder for holding an objective lens at an extension thereof, said lens holder being rotatably and slidably fitted onto aid supporting shaft at a position of the center of gravity of said lens holder and being provided with focusing coils and tracking coils; and
    lead wires extending to said focusing coils and lead wires extending to said tracking coils, said lead wires being stretched between said base and said lens holder in a plane substantially perpendicular to said supporting shaft in axi-symmetrical relation with respect to Y axis joining said supporting shaft and said objective lens and X axis substantially perpendicular to said Y axis.

12. An objective lens driving apparatus according to claim 11, wherein said lead wires are formed as four springs having substantially the same characteristics.

13. An objective lens driving apparatus according to claim 12, wherein said four springs are secured to said base through viscous elastic material.

14. An objective lens driving apparatus according to claim 11, wherein said four lead wires are secured to said base through viscous elastic material.

15. An objective lens driving apparatus according to claim 11, wherein two focusing coils and four tracking coils are arranged symmetrically with respect to said Y axis and said X axis.

* * * * *